US008469126B2

(12) United States Patent
Wuthrich et al.

(10) Patent No.: US 8,469,126 B2

(45) Date of Patent: Jun. 25, 2013

(54) EQUIPMENT WITH HYDRAULICALLY DRIVEN ELECTRICAL OVER HYDRAULIC CONTROL

(75) Inventors: Timothy Karl Wuthrich, Cochrane (CA); Joshua James Poffenroth, Cochrane (CA)

(73) Assignee: 356864 Alberta Ltd., Airdrie (CA)

( * ) Notice: Subject to any disclaimer, the term of this patent is extended or adjusted under 35 U.S.C. 154(b) by 378 days.

(21) Appl. No.: 12/925,120

(22) Filed: Oct. 14, 2010

(65) Prior Publication Data

US 2011/0097181 A1 Apr. 28, 2011

(30) Foreign Application Priority Data

Oct. 22, 2009 (CA) ..................................... 2683333

(51) Int. Cl.
*B60K 25/00* (2006.01)

(52) U.S. Cl.
USPC .............................. 180/53.4; 180/53.8; 173/1

(58) Field of Classification Search
USPC ................................. 180/53.4, 53.8; 173/1, 2
See application file for complete search history.

(56) References Cited

U.S. PATENT DOCUMENTS

| | | | | |
|---|---|---|---|---|
| 4,776,750 | A | 10/1988 | Griswold et al. | |
| 6,510,902 | B1 | 1/2003 | Prokop et al. | |
| 7,904,225 | B2 * | 3/2011 | Takeda et al. | 701/50 |
| 2010/0256837 | A1 * | 10/2010 | Schmidt | 701/2 |
| 2011/0016756 | A1 * | 1/2011 | Schmidt | 37/403 |

OTHER PUBLICATIONS

PCT/US09/38711 specification, drawings, and claims are attached.*

* cited by examiner

*Primary Examiner* — Drew Brown
(74) *Attorney, Agent, or Firm* — Kenneth H Johnson

(57) ABSTRACT

Motorized vehicles having hydraulic tools as attachments are well known. Examples includes road graders, excavators, snow ploughs (and nursery equipment such as tree spades, tree movers and tree handling equipment), tractors, front loaders, and skid steers.

A single hydraulic tool may be controlled by a simple manually operated hydraulic control system if the operation of the hydraulic tool is not complex. The use of "Electric over Hydraulic control" is more commonly used for hydraulic attachments with more complex functionality. A typical electric over hydraulic control system uses a bundle of wires; in which each wire in the bundle is dedicated to a particular operational feature of the attachment. These wires are prone to failure as a result of the wear and tear they are exposed to during normal use of the equipment. This, in turn, has led to proposals for the use of a wireless control system. The power for a wireless control system may be provided by a battery, however, a battery operated system may also not be robust enough to stand up to the wear and tear caused by operation of the equipment. These problems are mitigated by the present wireless, electric over hydraulic control system in which the electric power to operate the wireless control system is provided by an electrical generator that is driven by hydraulic fluid.

The present invention is especially advantageous for the operation of nursery equipment in which several different hydraulic attachments are used with a single motorized vehicle and where the different attachments must be disconnected and re-connected to allow use thereof.

14 Claims, 5 Drawing Sheets

EQUIPMENT WITH HYDRAULICALLY DRIVEN ELECTRICAL OVER HYDRAULIC CONTROL

FIELD OF THE INVENTION

This invention relates to control systems for motorized vehicles that are equipped with hydraulic attachments. Examples of such vehicles include road graders, snow ploughs, bulldozers, excavators, and nursery equipment.

BACKGROUND OF THE INVENTION

The use of hydraulic attachments on motorized vehicles is common. Two well known examples are road graders and snow ploughs. For clarity, the term "hydraulic attachment", as used herein, refers to—for example—the plough on a snow plough, or the blade on a grader, or the tree spade, elements on a motorized tree spade. The motorized vehicle contains a motor or engine (such as a gasoline or diesel engine) that drives the vehicle and also provides energy to a hydraulic pump which drives the hydraulic attachments.

Several types of control systems for the hydraulically driven components are in widespread use, as briefly outlined below.

A "manual over hydraulic" control may be appropriate for a hydraulic attachment with a limited range of functions. In one simple system, a single hydraulic valve is located on the power unit (or pump), and this valve provides on/off control for an attachment that is connected to the valve by way of a single pair of hydraulic lines.

The use of a control system with multiple hydraulic valves that may be manually operated provides additional flexibility for slightly more complicated hydraulically driven attachments.

For more complicated hydraulic components, the use of an "electric over hydraulic" control system is often employed, especially when the hydraulically driven attachment has five or more separate features. A typical electric over hydraulic control system would include a plurality of hydraulic lines, a plurality of valves to control the flow to the hydraulic lines, and an actuation system for the valves that responds to an electric signal. The use of well known solenoid valves is commonly employed. One advantage of the electric over hydraulic control is that it allows for a great deal of design flexibility. In general, another "feature" of the hydraulic system may be readily added by adding another solenoid valve set, hydraulic lines and wire. However as the number of features increases, the number of electric wires also increases. It is not uncommon to have more than a dozen wires in a control cable for a complicated hydraulic system—such as the hydraulic system for a tree spade or other nursery equipment such as tree moving and handling equipment. This control cable is often subject to a considerable amount of abuse during the normal operation of the machinery. Problems arise when the wires become disconnected, or when the cable is pinched, and or pulled apart. Repair of the system can be particularly time consuming if the problem is intermittent (as may be caused by a loose connection) or when attempting to repair a single wire in the cable (which requires that the wire be correctly identified) or even when replacing the whole cable (which requires that all of the new wires are properly re-connected). Accordingly, a need exists for a hydraulic control system that is robust enough to face heavy use and which may be quickly replaced when failure occurs.

Furthermore, a conventional, wired, electric over hydraulic control system requires two sets of hookups between the motorized vehicle and the hydraulic tool—namely the hydraulic hook up system and the electric hook up system. Many operators of motorized/hydraulic equipment will use more than one type of tool with the motorized vehicle.

For example, a nursery operator may have one tool to dig trees (a "tree spade"), another tool to wrap the trees and a third tool to move large potted plants and trees.

One operator error that sometimes occurs when changing hydraulic attachments is that the hydraulic lines are properly disconnected but the electric cable is not. Thus, when the vehicle attempts to drive away from the particular detached tool, the electrical hook up is torn apart.

The use of wireless control systems in motorized/hydraulic equipment is contemplated in U.S. Pat. No. 4,776,750 (Griswold). However the wireless system that is contemplated by Griswold et al. is not a wireless control system that is powered by electricity from a generator driven by hydraulic fluid.

U.S. Pat. No. 6,510,902 (Prokop) describes a hydraulically driven rock fracturing machine. The Prokop machine has an electronic data acquisition system that monitors the use of the machine. This data acquisition system may be powered by electricity that is generated from a generator that is powered by hydraulic fluid; however, the data acquisition system of Prokop is not an electric over hydraulic control system that controls a hydraulic attachment based on an input signal from an operator.

SUMMARY OF THE INVENTION

In one embodiment, the present invention provides equipment comprising a motorized vehicle; a hydraulic attachment that is connected to and co-operates with said motorized vehicle; and a wireless control system for said hydraulic attachment, said equipment comprises:

a) a hydraulic power supply that is powered by said motorized vehicle;
b) a hydraulic fluid supply system that provides hydraulic power under pressure to said hydraulic attachment; wherein said hydraulic fluid supply system includes at least one hydraulic fluid supply line and at least one hydraulic return line;
c) an electrical generator that is attached to said hydraulic fluid supply system and which generates electricity when driven by hydraulic fluid supplied under pressure from said hydraulic supply system;
d) a plurality of hydraulic control valves that are attached to said hydraulic fluid supply system and to said attachment; and wherein said wireless control system:
   (i) is connected to said generator and receives said electricity from said generator;
   (ii) communicates with said hydraulic control valves; and
   (iii) includes a wireless signal element that provides signals to actuate said hydraulic control valves.

In another embodiment, the present invention provides a hydraulic attachment for use with a motorized vehicle, said hydraulic attachment including a wireless control system for said hydraulic attachment, wherein said hydraulic attachment comprises:

a) a hydraulic power supply that is powered by said motorized vehicle;
b) a hydraulic fluid supply system that provides hydraulic power under pressure to said hydraulic attachment; wherein said hydraulic fluid supply system includes at least one hydraulic fluid supply line and at least one hydraulic return line;

c) an electrical generator that is attached to said hydraulic fluid supply system and which generates electricity when driven by hydraulic fluid supplied under pressure from said hydraulic supply system;
d) a plurality of hydraulic control valves that are attached to said hydraulic fluid supply system and to said attachment; and wherein said wireless control system:
  (i) is connected to said generator and receives said electricity from said generator;
  (ii) communicates with said hydraulic control valves; and
  (iii) includes a wireless signal element that provides signals to actuate said hydraulic control valves.

The present invention requires the above noted electrical generator. The present invention does not encompass a wireless control system that is operated solely by a stand-alone battery on the hydraulic attachment (because the use of such a battery would require that the battery be re-charged or replaced, which is inconvenient in comparison to the use of the generator of the present invention).

DETAILED DESCRIPTION OF PREFERRED EMBODIMENTS

Figure 1:
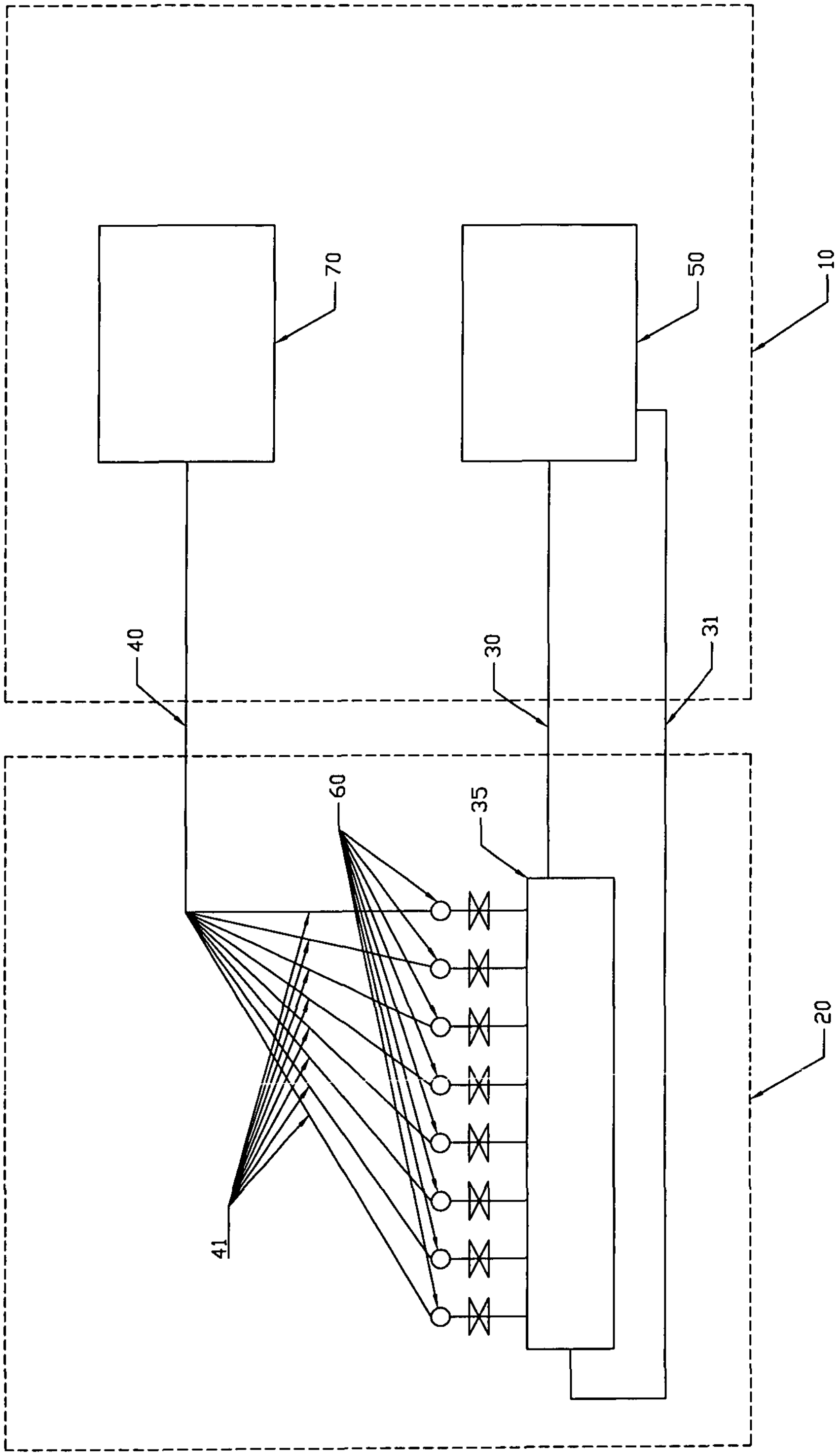
Figure 1 Prior Art
FIG. 1: is a schematic view of prior art equipment that is controlled with a wired electrical over hydraulic control system.

Referring to FIG. 1 (Prior Art), a motorized vehicle 10 is connected to a hydraulic attachment 20 (which hydraulic attachment 20 may also be referred to herein as a hydraulic tool or by reference to a particular type of tool such as a tree spade) by way of at least one hydraulic fluid supply line 30 and an electrical cable 40 that contains a plurality of individual electrical wires 41. The hydraulic fluid supply line 30 is connected to hydraulic power supply 50 (which hydraulic power supply 50 is typically a hydraulic pump) that provides hydraulic fluid under pressure through supply line 30 and receives used hydraulic fluid through at least one hydraulic fluid return line 31.

It will be recognized by these skilled in the art that more than one supply line 30 and or more than one return line 31 may be employed. For convenience, the supply line 30 and return line 31 may be referred to as a hydraulic supply system.

In the configuration shown in FIG. 1, a hydraulic fluid header 35 receives hydraulic fluid under pressure in the supply line 30. The hydraulic fluid flows through hydraulic valves 60 when valves 60 are open. Valves 60 are preferably actuated by a conventional solenoid (not shown) in response to a signal that is received by a human operator (not shown) who actuates a signal generating device. A typical signal generating device is an operator control handle or "joystick" with a plurality of buttons and wherein each button is connected to an individual wire 41. Thus, by pushing a button on the joystick 70, the operator causes a signal to be sent through a wire 41 to actuate a hydraulic valve 60. Each hydraulic valve 60 is connected to a function (not shown) on the attachment 20. (For clarification when the attachment 20 is a tree spade with a plurality of spade elements, each of the spade elements may be operated in response to a dedicated hydraulic valve 60.)

As previously noted the electrical cable 40 is normally exposed to a considerable amount of wear and tear during operation of the equipment.

Figure 2:
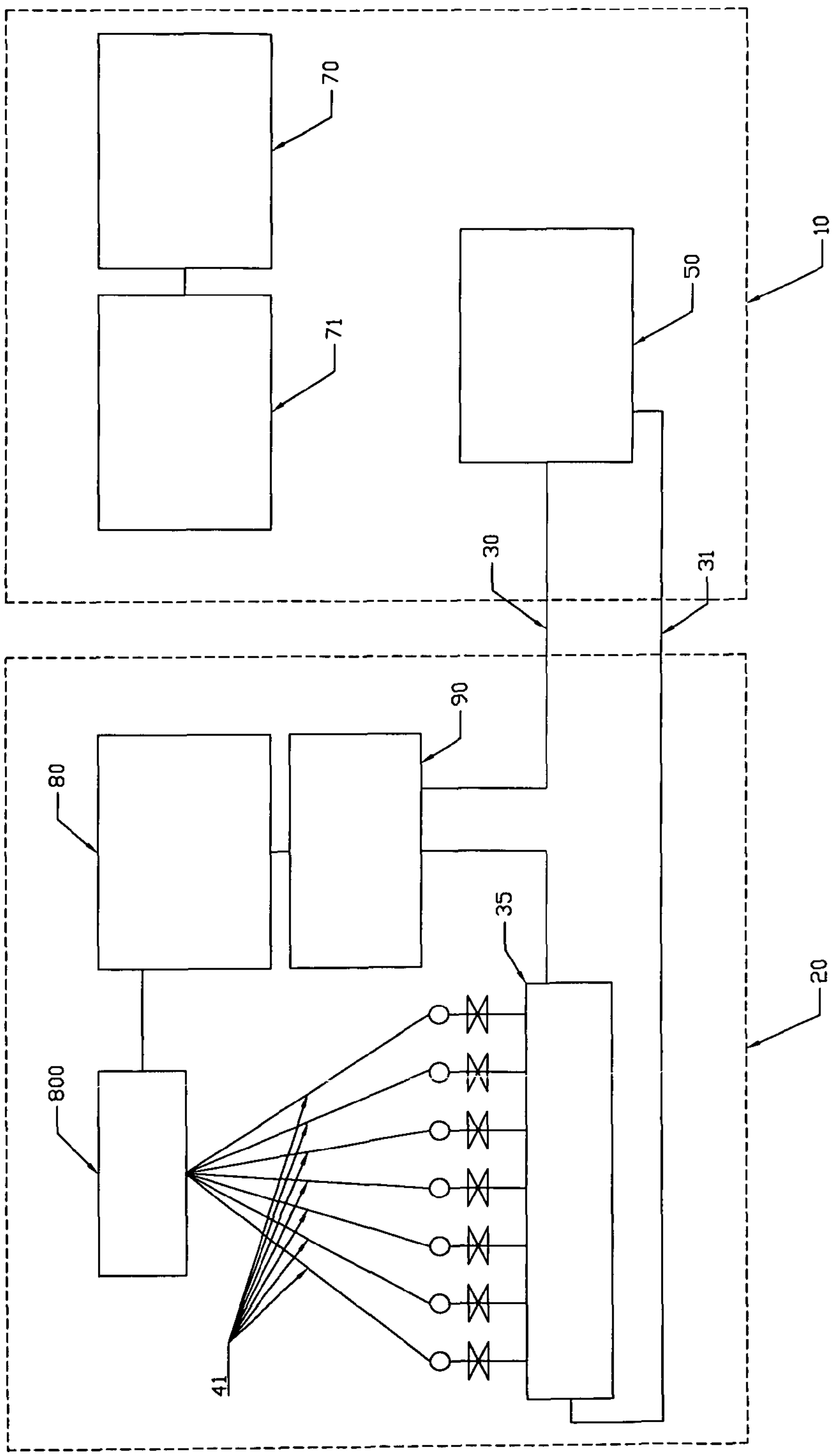
FIG. 2: is a schematic view of the invention in which a motorized vehicle with a hydraulic attachment utilizes a wireless electric over hydraulic control system wherein electric power for the control system is provided by a generator that is powered by hydraulic fluid.

The present control system eliminates the electrical cable 40—as schematically illustrated in FIG. 2.

Referring to FIG. 2, one important feature is that the wireless system contains a wireless signal element 71 (preferably, 71 is a radio transmitter) and receiver 80 (and, preferably the receiver 80 is a radio receiver). The radio transmitter 71 is connected to a signal generating device 70 (which is most preferably, a joystick, or pistol grip handle, that operates in eventually the same manner as the prior art joystick described above).

FIG. 2 also shows an electrical generator 90 that receives hydraulic fluid under pressure. The generator 90 provides electricity to operate the electric over hydraulic control system of the present invention.

As previously noted, the signal generating device 70 is preferably a joystick or the like. The preferred joystick 70 may be simply connected to the electrical system of the motorized vehicle 10 or an independent battery. For example, this may be done using a "plug in" that co-operates with a cigarette lighter attachment that commonly exists in such motorized vehicles. In another alternative the preference joystick 70 might be directly wired to the existing battery in the motorized vehicle.

By pushing buttons on the joystick 70, the operator causes the radio transmitter to send signals to the radio receiver 80. The signals from the radio receiver are used to actuate valves in the electric over hydraulic control system that is schematically represented by box 800. Electrical power for the electric over hydraulic control system is provided by the hydraulic generator 90.

Figure 3:
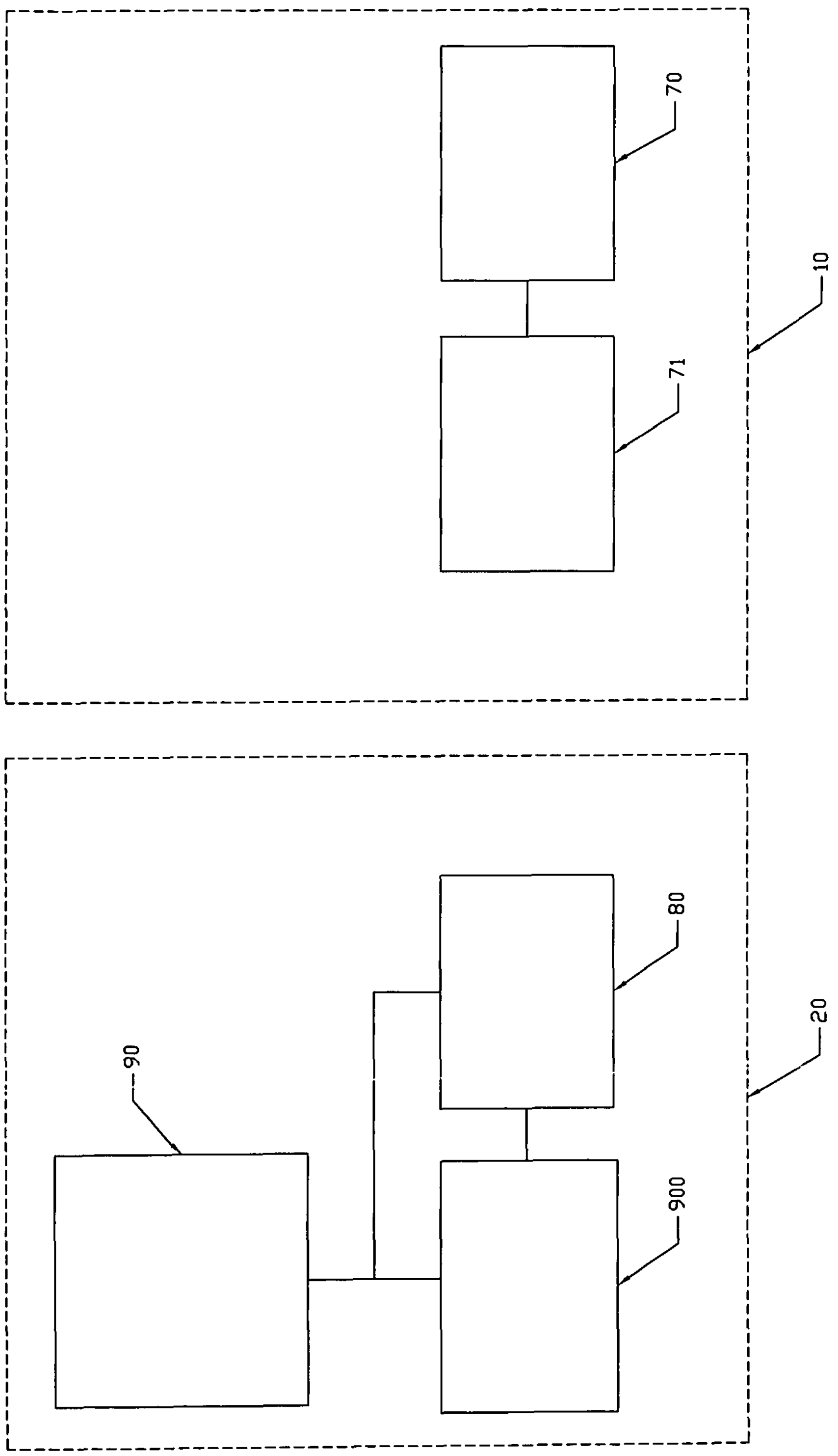
FIG. 3: is a schematic view which provides further detail of certain aspects of the wireless control system.

FIG. 3 provides a schematic representation of the cooperation between the wireless signal element 71, the signal generating device 70, the receiver 80, the electrical generator 90 and the electric over hydraulic control system 900.

Figure 4:
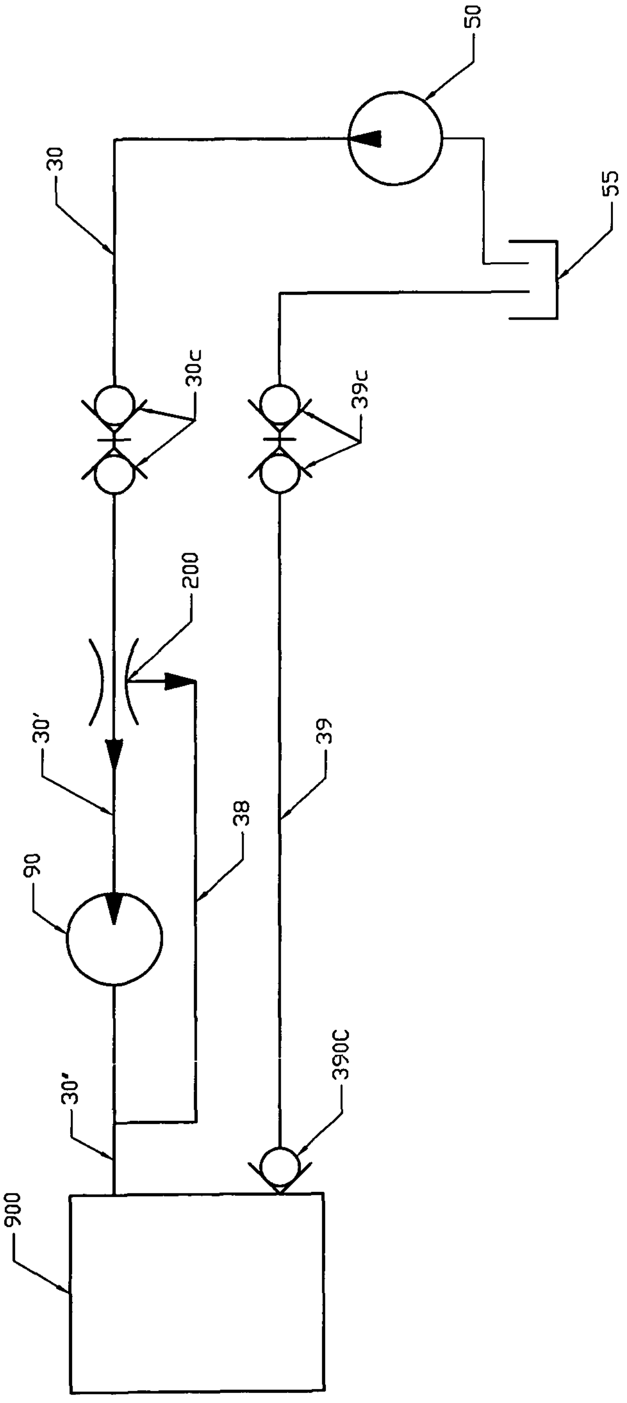
FIG. 4: is a schematic view of a preferred embodiment of this invention in which a hydraulic flow control valve and a hydraulic flow control valve are employed to facilitate the operation of the generator.

Further details regarding the operation of the hydraulic generator 90 are illustrated in FIG. 4.

The hydraulic power supply 50 (which, as previously noted, is a hydraulic pump preferably a hydraulic pump that is powered by the motorized vehicle) provides a source of hydraulic fluid under pressure through line 30. The hydraulic line 30 includes a coupling device 30C which couples the hydraulic line, from the motorized vehicle to the hydraulic line 30' that enters the hydraulic attachment. In a highly preferred embodiment, the hydraulic line 30' that powers the generator 90 is diverted through a flow control valve 200. The purpose of flow control valve 200 is generally to regulate the flow through the generator 90 in order to provide the desired current (further details are provided below).

A bypass hydraulic line 38 is preferably included to receive part of the hydraulic fluid and thereby, (together with the flow control valve 200) regulate the motor speed to provide a consistent current supply from the generator.

The generator 90 provides electricity to power the control system. Further description of the preferred embodiments of the electrical generator 90 is provided below.

The hydraulic bypass line 38 preferably joins with the hydraulic fluid exiting the electrical generator 90 in a common hydraulic line 30". The hydraulic fluid under pressure from hydraulic line 30" is then used to drive the hydraulic attachment control system, schematically illustrated by box 900. Hydraulic fluid is returned via line 39 to tank 55. Coupling device 39*c* couples the return hydraulic 39 to the tank 55. Check valve device 390*c* restricts the hydraulic flow to one direction, through the control system 900, for the correct operation of the flow control device 200. Each of the coupling devices (30*c* and 39*c*) preferably includes check valves that are only active when the coupling devices are disconnected to stop the flow of hydraulic fluid out of the hydraulic system. As will be appreciated by those skilled in the art box 900 (in FIGS. 3 and 4) is intended to include the hydraulic valves that are driven by the hydraulic fluid that enters box 900.

Figure 5:
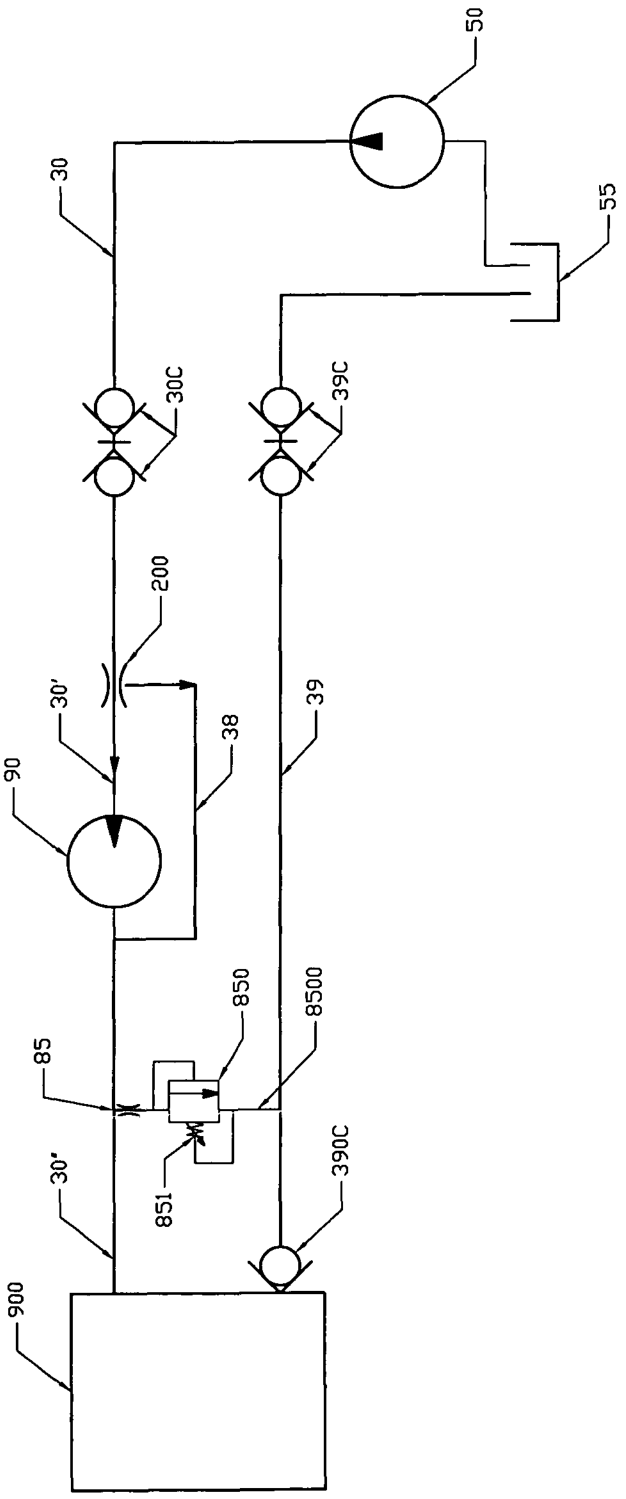
FIG. 5: illustrates a preferred embodiment in which a second hydraulic bypass line is provided to allow hydraulic fluid flow to the generator when a hydraulic cylinder is at the end of a stroke.

Referring now to FIG. 5. FIG. 5 illustrates a preferred embodiment of this invention in which a second hydraulic flow by-pass circuit is included to provide some hydraulic flow to the generator 90 at times when flow through the main hydraulic line is low (such as when a hydraulic cylinder is reaching the end of a stroke). This by-pass system includes an orifice 85, a relief cartridge 850 (equipped with a spring setting 851) and hydraulic by-pass flow lines 8500. The relief cartridge opens when flow through the main hydraulic lines is limited. The pressure setting on the relief cartridge is set at a value lower than the maximum permitted hydraulic pressure. This is described as follows with reference to a specific (non-limiting) example in which the maximum permitted hydraulic pressure is about 3,000 pounds per square inch (psi) and the hydraulic pressure through line 30 is typically about 1,000-2,000 psi during normal hydraulic flow. In this example, the pressure setting on the relief cartridge is set at 2800 psi—i.e. about 5-10% below the maximum permitted pressure of 3000 psi. Thus, when the main hydraulic flow is low and pressure builds the relief cartridge 850 opens to allow flow through the generator 90 and bypass flow lines 8500 and thereby allows electrical generation.

The above schematic diagrams are included to illustrate preferred embodiments. As will be appreciated by those skilled in the act, many other arrangements of the elements described above (particularly with respect to the hydraulic lines) are encompassed by the present invention.

Further details regarding preferred embodiments of these elements are provided below. Numbers in parentheses corresponds to numbers used in FIGS. 2-5.

A. Control System

1. Electrical Generator (90)

Electrical generators that are driven by hydraulic fluid are known and commercially available.

The EATON company offers for sale a hydraulic operated generator that is intended for use as a secondary/emergency power supply on aircraft.

The present invention is not limited to the use of any particular generator.

A preferred electrical generator for use in this invention generally includes a conventional rotor equipped with magnets and a conventional stator equipped with windings. These parts are well known. The preferred rotor and stator will be essentially the same as the rotor and stator from a small alternator, such as a motorcycle alternator. The rotor and stator are contained in a housing which is designed to receive hydraulic fluid under pressure. The action of the hydraulic fluid on the rotor produces alternating current (AC) voltage. This AC voltage is preferable fed into a conventional full wave bridge rectifier, thereby producing direct current (DC). The so rectified DC voltage is fed into a DC to DC converter (preferred example of which is commercially available under the trademark VICOR™ which can provide a 12 volt DC supply at 9 ampere). As will be readily understood, the desired current may be altered by non-inventive design changes.

2. Hydraulic Power Supply (50)

Motorized vehicles such as skid steers having a hydraulic power supply are widely available and are preferred. The conventional hydraulic pump used on most of such motorized vehicles (with hydraulically controlled attachments) are fixed displacement gear pumps, with a flow of 7 to 35 imperial gallons per minute, depending on make, model, and engine speed. The pump feeds a directional valve, which controls the direction of hydraulic flow.

3. Hydraulic Valves (60)

The present invention is not limited to the use of any particular valve. Commercial valves are available under the trademarks Hydra-force, Hyspec, Prince, Sauer-Danfoss, Hawe, Denison, Parker, Eaton-Vickers, and Salami. The preferred valves have electric solenoids that actuate the valves through an electric signal from the wireless controller.

4. Wireless Signal Element (70)

The wireless system is preferably powered from the battery system of the motorized vehicle, either hard wired or through the cigarette lighter. The system receives a command from the operator's Pistol controller or joystick into the transmitter. It then sends out a digital signal to the receiver to indicate which input has been selected. The signals are preferably coded.

Thus, signals between the transmitter and receiver are preferably ignored unless the correct address is sent with the command signal.

Once the receiver receives a command from the correct transmitter it energizes the appropriate output to the hydraulic control valve.

The signals are preferably setup to be momentary so that the valve is only energized while the appropriate button on the pistol controller is being pressed. Once there is no signal anymore the receiver stops energizing its output.

A preferred Wireless transmitter and receiver is available from Radiometrix and operates at 914 MHz with a short transmitting range.

5. Motorized Vehicle (10)

Commercially available examples of motorized vehicles for use in the present invention include:

- Skid Steer
- Skid Loader
- Front Loader
- Wheel Loader
- Track Loader
- Backhoe Loader
- Excavator
- Tractor
- Tele handler
- Telescopic Boom Forklift Each of these vehicles typically provides a mobile vehicle with a boom or arm to which various attachments can be mounted. The vehicle has a hydraulic pump coupled to the vehicle's engine that provides hydraulic flow under pressure to the hydraulic attachments. A skid steer is preferred.

6. Attachments (20)

In general, any hydraulic attachment that cooperates with a motorized vehicle is potentially suitable for use in the present invention. Examples include snow plows, grader blades, bulldozer blades, augers for drilling posts and nursery equipment. Preferred nursery equipment is described below:

a) Tree Spade: an attachment that is comprised of a frame that encircles a tree with one or 2 portions (gate(s)) that pivot hydraulically to allow the user to open the gate(s) when approaching the tree and then close the gate(s) encompassing the tree. The frame and gate(s) then have a plurality of blades or shovels that ride along guiding towers, the towers are mounted to the frame and gate(s) and hydraulic rams force the shovels into the ground around the tree and overlap at their end of stroke to create a removable root ball that encompasses the tree's roots and stem. The tree is now able to be removed from the ground and moved to another location or place in a pot, sack or basket for future movement.

b) Tree handler: an attachment that allows movement of the trees once they have been placed in a pot, sack or basket. There are a variety of handlers from simple poles with chains attached to devices with hydraulically driven arms or gripping devices.

c) Wrapper: an attachment that gently folds the trees branches together to allow them to be bound with mesh, tie, or plastic to avoid damage to the tree during transport.

What is claimed is:

1. Equipment comprising a motorized vehicle; a hydraulic attachment that is connected to and co-operates with said motorized vehicle;

and a wireless control system for said hydraulic attachment, said equipment comprises:

a) a hydraulic power supply that is powered by said motorized vehicle;

b) a hydraulic fluid supply system that provides hydraulic power under pressure to said hydraulic attachment; wherein said hydraulic fluid supply system includes at least one hydraulic fluid supply line and at least one hydraulic return line;

c) an electrical generator that is attached to said hydraulic fluid supply system and which generates electricity when driven by hydraulic fluid supplied under pressure from said hydraulic supply system;

d) a plurality of hydraulic control valves that are attached to said hydraulic fluid supply system and to said attachment; and wherein said wireless control system:

(i) is connected to said generator and receives said electricity from said generator;

(ii) communicates with said hydraulic control valves; and (iii) includes a wireless signal element that provides signals to actuate said hydraulic control valves; wherein a flow control valve is installed in said hydraulic fluid system at a point directly upstream of said electrical generator and a hydraulic flow divider splits said hydraulic fluid under pressure such that part of said hydraulic fluid under pressure is directed to said electrical generator and part of said hydraulic fluid under pressure bypasses said electrical generator.

2. The equipment according to claim 1, wherein said wireless control system comprises a transmitter operated from said motorized vehicle and a receiver attached to said hydraulic attachment.

3. The equipment according to claim 2, wherein said wireless control system provides coded signals.

4. The equipment according to claim 2, wherein said operator provides input to said transmitter through a control interface that comprises a plurality of buttons; wherein each of said buttons corresponds to a controllable feature on said hydraulic attachment.

5. The equipment according to claim 4, wherein said interface is selected from the group consisting of a joystick and a pistol grip handle.

6. The equipment according to claim 1, wherein said motorized vehicle is a skid steer, loader, telehandler, tractor or excavator.

7. The equipment according to claim 6, wherein said hydraulic attachment is a nursery tool selected from the group consisting of:

a) a tree spade;

b) a tree handler; and c) a tree wrapper.

8. Equipment comprising a motorized vehicle; a hydraulic attachment that is connected to and co-operates with said motorized vehicle; and a wireless control system for said hydraulic attachment, said equipment comprises:

a) a hydraulic power supply that is powered by said motorized vehicle;

b) a hydraulic fluid supply system that provides hydraulic power under pressure to said hydraulic attachment; wherein said hydraulic fluid supply system includes at least one hydraulic fluid supply line and at least one hydraulic return line;

c) an electrical generator that is attached to said hydraulic fluid supply system and which generates electricity when driven by hydraulic fluid supplied under pressure from said hydraulic supply system;

d) a plurality of hydraulic control valves that are attached to said hydraulic fluid supply system and to said attachment; and wherein said wireless control system:

(i) is connected to said generator and receives said electricity from said generator;

(ii) communicates with said hydraulic control valves; and (iii) includes a wireless signal element that provides signals to actuate said hydraulic control valves; wherein a flow control valve is installed in said hydraulic fluid system at a point directly upstream of said electrical generator said generator comprises a rotor and stator and wherein said flow control valve and said hydraulic flow divider co-operate so as to drive said rotor at a speed, expressed in revolutions per minute, which is controlled to provide a consistent current supply from said electrical generator.

9. The equipment according to claim 8, wherein said wireless control system comprises a transmitter operated from said motorized vehicle and a receiver attached to said hydraulic attachment.

10. The equipment according to claim 9, wherein said wireless control system provides coded signals.

11. The equipment according to claim 9, wherein said operator provides input to said transmitter through a control interface that comprises a plurality of buttons; wherein each of said buttons corresponds to a controllable feature on said hydraulic attachment.

12. The equipment according to claim 11, wherein said interface is selected from the group consisting of a joystick and a pistol grip handle.

13. The equipment according to claim 8, wherein said motorized vehicle is a skid steer, loader, telehandler, tractor or excavator.

14. The equipment according to claim 13, wherein said hydraulic attachment is a nursery tool selected from the group consisting of:

a) a tree spade;
b) a tree handler; and
c) a tree wrapper.

* * * * *